Patented Mar. 13, 1951

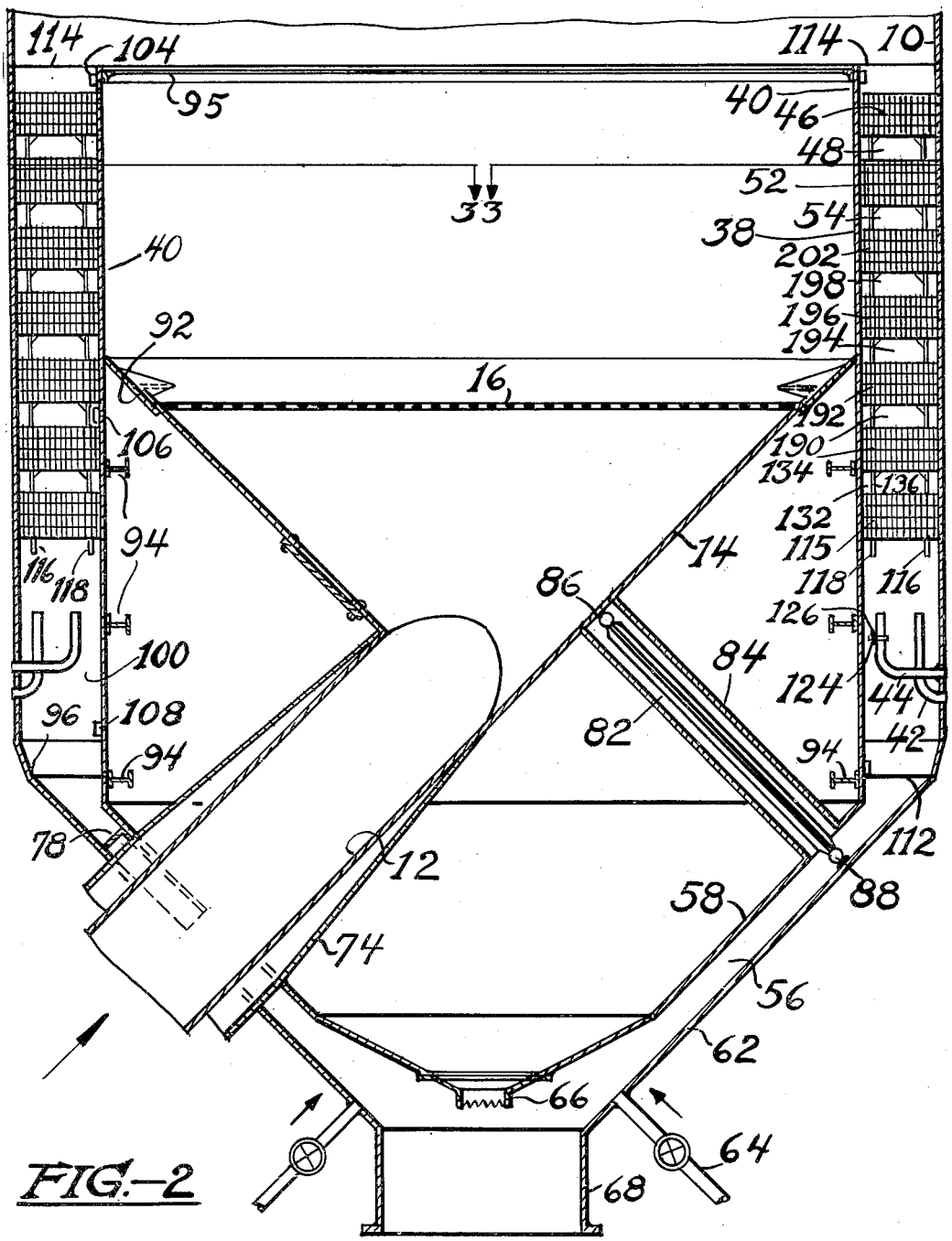

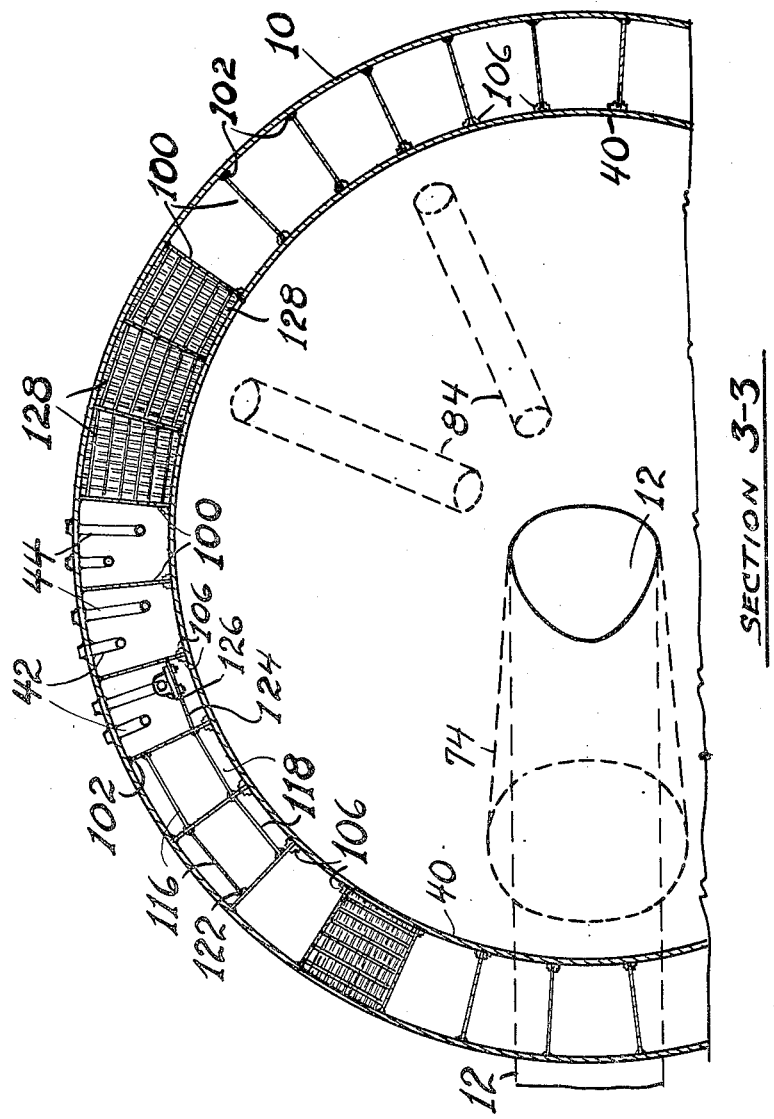

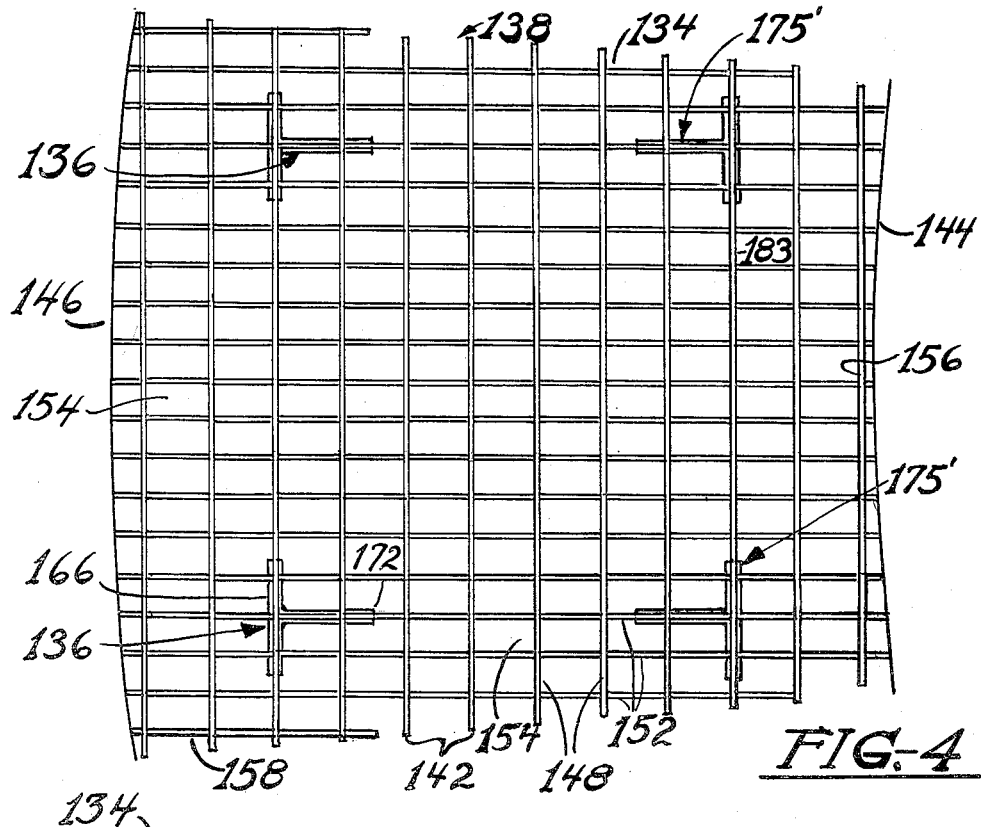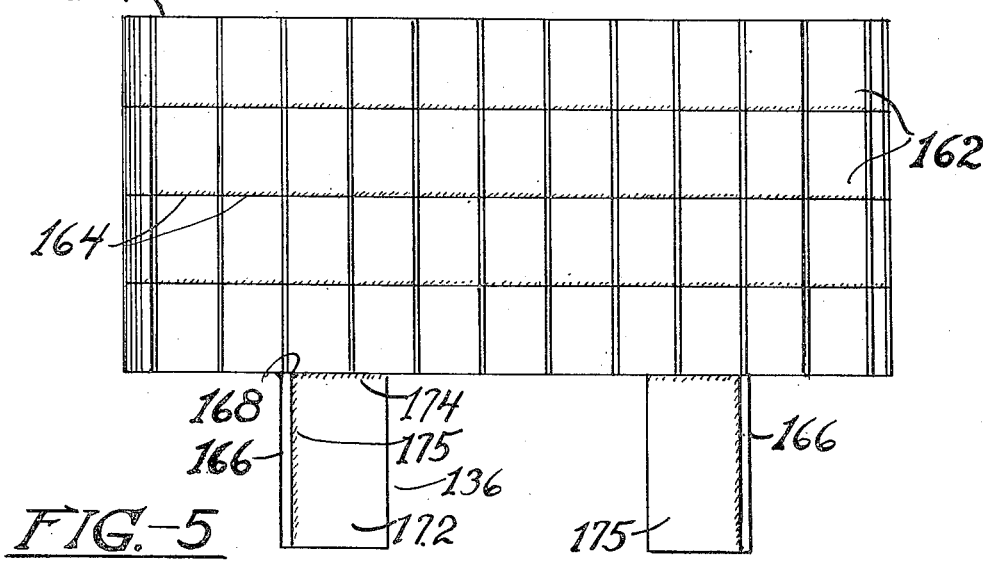

2,545,165

UNITED STATES PATENT OFFICE 2,545,165

GAS-SOLID CONTACTING APPARATUS, IN-
CLUDING MEANS FOR STRIPPING SOLID
PARTICLES

Henry J. Ogorzaly, Summit, N. J., assignor to
Standard Oil Development Company, a corporation of Delaware Application August 14, 1945, Serial No. 610,841

2 Claims. (Cl. 23—288)

This invention relates to apparatus for stripping volatile material from finely divided solids, and more particularly, relates to stripping volatile hydrocarbons from adsorbent catalyst or contact particles.

In the newer type of fluid catalyst cracking plant where the fouled catalyst or contact particles are withdrawn as a dense fluidized mixture from the bottom portion of the reactor and where large catalyst to oil ratios are used, the stripping of hydrocarbons from fouled catalyst or contact particles before regeneration has not been as efficient as desired.

Various baffled annular stripping sections have been used and cellular stripping sections have been used with improved results, but I have now found that using spaced bundles or cartridges of honeycomb cross-section results in improved stripping. The bundles or cartridges may be made up of superimposed cellular sections similar to subway grating sections or other open mesh or lattice work sections, or the cartridges may be made of deeper sections or of unitary construction.

According to my invention, an annular stripping section is divided into a plurality of vertically extending cells and each cell is filled with spaced bundles or cartridges of honeycomb or cellular cross-section. Each bundle or cartridge, except the lowermost bundle in each cell, is provided with depending spacing and supporting means, such as legs. The bottom bundle or cartridge in each cell is supported on bars secured at their ends to the cell walls.

In the drawings;

Fig. 2 represents a detailed vertical longitudinal cross-section of the lower portion of the reactor shown in Fig. 1;

Fig. 3 represents a horizontal transverse section of a portion of the reactor taken substantially on line 3—3 of Fig. 2 with parts omitted to facilitate the disclosure;

Fig. 4 represents a top plan view of one of the bundles or cartridges of honeycomb cross-section above the lowermost cartridge or bundle; and Fig. 5 represents a side elevation of the bundle or cartridge shown in Fig. 4.

Figure 1:
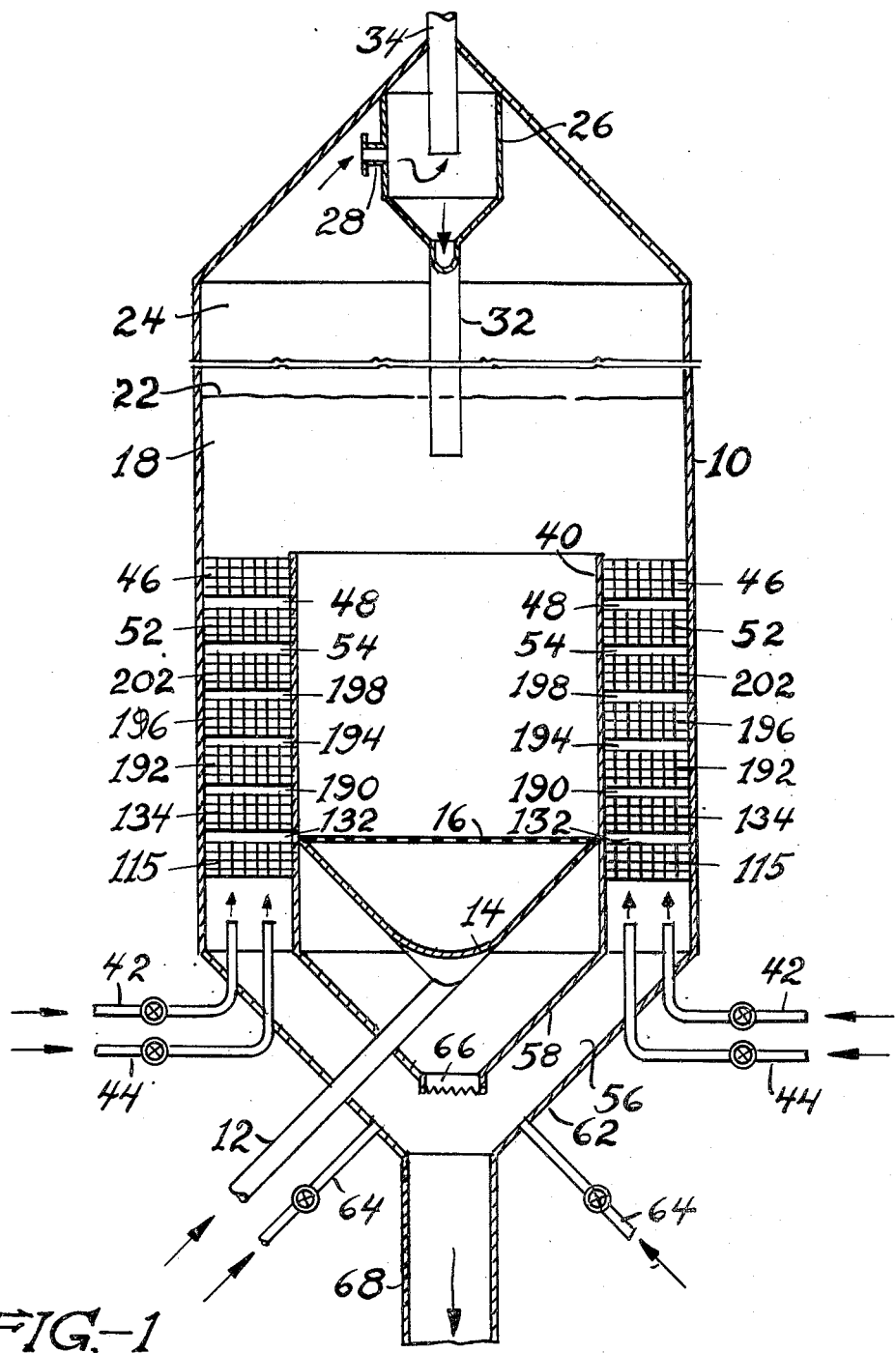
Fig. 1 represents a vertical longitudinal cross-section of a reactor with parts omitted and parts diagrammatically shown to facilitate the disclosure.

Referring now to the drawings and first to Fig. 1, the reference character 10 designates a cylindrical reaction vessel provided with a bottom inlet 12 for the introduction of reactants and powdered or finely divided catalyst or contact material. In the catalytic cracking of hydrocarbons, the reactants comprise higher boiling hydrocarbons and the catalyst material comprises any suitable cracking catalyst, such as acid-treated bentonite clay, synthetic silica alumina gels, synthetic silica magnesia gels, etc. For other hydrocarbon conversions suitable catalysts may be used.

The reactants may be in vapor form or in liquid form. If the reactants are in liquid form or partly in liquid and partly in vapor form, a sufficient amount of hot regenerated contact material is used to vaporize the reactants and supply the heat of reaction.

The inlet 12 is provided at its inner end with conical inlet member 14 provided at its upper end with a perforated distribution grid plate 16 for distributing the catalyst or contact particles and reactants across the area of the reactor 10. The distribution plate 16 is circular in form and is concentric with the cylindrical reactor 10. If desired, the catalyst or contact particles and the reactants may be introduced separately into the reactor 10 in which case the vaporous reactants are introduced through line 12 so that they pass upwardly through the reaction vessel 10.

The velocity of the upflowing gases or vapors passing through the reaction vessel 10 is selected to maintain the particles as a dense fluidized dry liquid-simulating mixture. This dense mixture is shown at 18 with a level 22. Using finely divided material, such as the cracking catalysts above described, and having a size of about 200 to 400 standard mesh, the superficial velocity of the gases or vapors passing through the reactor 10 may vary between about 0.5 feet/second and 2.0 feet/second, in which case the density of the fluidized mixture shown at 18 will be about 30 lbs./cu. ft. to 10 lbs./cu. ft.

By superficial velocity is meant the velocity of the gases with no solids present in the reactor 10. Under the above conditions, the dense fluidized mixture shown at 18 is in a turbulent condition and the temperature throughout the dense bed or mixture is substantially uniform.

Above the dense bed or mixture 18 is a dilute phase or dispersed phase 24 in which the vaporous reaction products passing upwardly from the dense bed or mixture 18 contain entrained solid particles. However, the density of the dilute suspension shown at 24 is much less than the dense mixture shown at 18. The dilute suspension passes upwardly into the separating means 26 by means of inlet 28 for separating entrained solid particles from the vaporous reaction products. The separating means is shown as a cyclone separator arranged in the upper part of the reaction vessel 10 but other forms of separating means may be used, such as, for example, multiclones, etc. The separating means may be located outside the reactor 10. More than one separating means may be used in parallel or in series.

The separated solid particles are withdrawn from the separating means 26 through dip leg or pipe 32 which extends below the level 22 of the dense mixture 18 and returns the separated particles to the dense bed or mixture 18.

The vaporous reaction products passing overhead through line 34 are further treated to separate desired products. For example, in the catalytic cracking of hydrocarbons, the vapors are passed to a fractionating system for separating gasoline and other products from cycle oil.

During the conversion, the catalyst or contact particles become contaminated or fouled with combustible material. In the catalytic cracking of hydrocarbons, carbonaceous material containing some hydrogen is deposited on the catalyst or contact particles. The fouled catalyst or contact particles are withdrawn as a dense mixture from the dense fluidized bed or mixture 18, and in being so withdrawn, entrain hydrocarbon vapors therewith. The withdrawn fouled particles are introduced into the upper portion of an annular stripping zone or section 38 formed by the lower portion of the wall of the reactor 10 and a smaller cylindrical baffle or member 40 spaced from the inner wall of the reactor 10. The annular member 40 extends above and below the distribution plate 16 and is of a slightly larger diameter.

Stripping gas, such as steam, is introduced into the bottom portion of the stripping zone or section 38 through lines 42 and 44. As will be hereinafter described in greater detail, the annular stripping section is composed of a relatively large number of vertical elongated cells and preferably each cell is provided with a pair of stripping gas inlet lines 42 and 44.

As shown in Fig. 1, the stripping section 38 is provided with a cartridge insert or bundle of cellular sections 46 at the upper part of the stripping section. Each cartridge insert or bundle, in the specific form shown, is formed of several layers of grating with a honeycomb type of cross-section superimposed in aligned relation to provide a multiplicity of parallel channels or cells with continuous walls. Preferably the grating sections are similar to subway grating but are of greater depth, preferably, but other open mesh or lattice work construction may be used to fabricate the cellular bundles or cartridges, or each cartridge may be made of unitary construction instead of layers.

Below this cellular bundle or cartridge 46 is a space 48 or zone of open cross-section below which there is another bundle or cartridge 52. Below the bundle or cartridge 52 is another space 54. The bundles or cartridges and spaces alternate down through the rest of the stripping section as will be hereinafter described in greater detail.

The stripped solid particles leave the bottom of the stripping section or zone 38 in a dense fluidized condition and are passed into the passageway 56 formed between inverted cone member 58 and the bottom portion 62 of the reaction vessel 10. Additional stripping or fluidizing gas is introduced through line or lines 64 into the bottom wall 62 of the reactor 10 to maintain the particles in a fluidized liquid-simulating condition as they flow down through the passageway 56.

The inverted conical member 58 is preferably secured to the bottom of the annular member 40 to close off the space below the conical inlet member 14. The lower portion of the inverted conical member 58 is preferably provided with an opening 66 through which may be vented gas introduced into the space between the conical members 58 and 14 to prevent accumulation of finely divided solids in this space.

The stripped particles flow into the top of the standpipe 68 in which the particles are maintained in a fluidized condition by the introduction of fluidizing gas at one or more spaced points (not shown) and the stripped, fouled or contaminated particles are passed to a regeneration zone (not shown) for burning off the combustible deposits. The standpipe 68 is of sufficient height to produce a hydrostatic pressure at the base of the standpipe which pressure is utilized for moving the particles through the regeneration zone.

Referring now to Fig. 2 wherein the same reference characters identify the same parts described in connection with Fig. 1. In this detailed showing it will be seen that a conical member 74 surrounds a portion of the inlet 12 to provide a construction permitting contraction and expansion of the parts during use. A semi-circular guard plate 78 is preferably provided for the upper portion of the conical member 74 just described to protect the top portion of the conical member 74 from abrasion as the solid particles pass down through the passageway 56. The semi-circular guard member 78 is arranged between the inverted conical member 58 and the bottom conical portion 62 of the reaction vessel 10.

The inlet conical member 14 is partially positioned and supported by means of a plurality of braces, one of which is shown at 82 in Fig. 2. The brace 82 is arranged in a housing 84 which extends from the inverted conical member 58 to the conical inlet member 14. The upper end of the brace 82 is pivotally secured at 86 to the conical member 14 and at its lower end is pivotally connected at 88 to the bottom conical wall 62 of the reaction vessel 10.

Grid plate 16 is shown as of a smaller diameter than cylindrical baffle 40 and a tapered annular member 92 is provided between plate 16 and baffle 40 to close off this space.

Welded to the inner wall of the cylindrical baffle 40 are three rings shown at 94 for maintaining the form of the cylindrical baffle 40. Similarly a ring 95 is provided at the top of the baffle 40 for the same purpose.

The outer lower portion of the stripping section 38 is provided with a tapered ring 96 to provide a smooth passage for the fluidized particles as they pass down from the bottom of the stripping section 38.

As above pointed out, the annular stripping section is subdivided into a relatively large number of vertical elongated cells. This is accomplished by providing radial baffles 100 (see Fig. 3) between the annular member 40 and the lower portion of the wall of the reactor 10. Preferably the outer ends of these vertical baffles 100 are welded as shown at 102 to the inner wall of the lower portion of the reaction vessel 10. Usually an internal liner is provided to protect the wall of the reaction vessel 10 from erosion in the stripping zone 38. Such a liner is attached to the wall by plug welds and the vertical radial baffles 100 are then welded at their outer ends as shown in 102 to the liner instead of to the vessel wall.

The inner ends of each baffle 100 are held in place by three clips shown at 104, 106 and 108, which are welded to the outer wall of the cylindrical member 40. While three clips have been shown, it will be understood that a larger number of clips may be used, if desired. These clips are formed of L-shaped angles in Fig. 3 with the two angles forming each clip in one vertical row spaced sufficiently apart to receive the inner end of one of the vertical baffles 100.

In this form of the invention the vertical baffles 100 extend for substantially the entire length of the stripping zone or section 38. Each baffle extends from a point below the lower clip 108 as shown at 112 to about the top of the cylindrical member 40 and above the top clip 104 as shown at 114. In this way vertical elongated cells are provided for the entire stripping section and the baffles 100 forming the cells extend below the stripping gas inlet lines 42 and 44 so that a set of stripping gas inlet lines 42 and 44 is provided for the bottom portion of each cell.

The cellular cartridges or bundles formed of grid sections are of such dimensions as to fit into the cells formed in the stripping section 38 as will be presently described in greater detail. The lowermost bundle or cartridge 115 shown in Fig. 2 and in each cell rests on and is supported by parallel cross bars 116 and 118 shown in Figs. 2 and 3. These cross rods 116 and 118 are welded at their ends to the walls of adjacent vertical baffles 100 as shown in Fig. 3. The stripping gas lines 42 and 44 have their outlets arranged a distance below bottom bundle or cartridge 115 and the dense fluidized contact material flowing down disperses the upflowing gas before the gas reaches bottom bundle 115.

In Fig. 2 it will be seen that the stripping line 44 has a longer horizontal portion than the stripping line 42 and preferably the vertical inner portion of the stripping line 44 is supported or securely held in place by providing a cross bar 124 welded at its ends to the walls of adjacent baffles 100. The vertical inner portion of the stripping line 44 is secured to this cross bar 124 by a U-bolt 126 shown in Figs. 2 and 3.

Arranged above the bottom cartridge or bundle 115 in each cell is a space 132 above which is provided another bundle or cartridge 134 of honeycomb cross section. The bundle or cartridge 134 is provided with spacing and supporting means 136 extending from the bottom of the bundle or cartridge 134 as will be presently described.

Referring now to Fig. 4, there is shown a top plan view of one of the cartridges or bundles of honeycomb cross-section. This bundle or cartridge is designated 134 and is representative of all of the bundles or cartridges above the bottom bundle or cartridge 115. The bundle or cartridge 134 differs from the lowermost bundle or cartridge 115 in the provision of the depending supporting and spacing means 136. The lowermost cartridge or bundle 115 is supported on the bars 116 and 118.

Except for the supporting and spacing means 136, the cartridge or bundle 134 has the same shape and the same construction as the bottom bundle or cartridge 115. A description of this one bundle will suffice for both the lowermost cartridges and the remaining cartridges.

Because the vertical baffles 100 are radially arranged, it is necessary to cut off the sides of the cartridge or bundle 134 as shown at 138 (top of Fig. 4) and 142 (bottom of Fig. 4). The ends of the bundle or cartridge 134 are cut along an arc so that the inner ends have different lengths as shown at 144 and the outer end is formed along the arc of a circle as shown at 146. As shown in Fig. 4, some of the ends of the grating adjacent the vertical baffles 100 are cut away to facilitate introduction of the cartridges or bundles into the cells. Since inspection of the equipment is facilitated by ease of removal of the bundles or cartridges, they are preferably made of a slightly smaller size than the cells to allow for some distortion during use without a freezing of the parts into position.

Each bundle or cartridge is formed of a plurality of grating sections. Any open mesh, honeycomb or lattice work construction may be used. As shown in Fig. 4, a plurality of spaced parallel strips or straps 148 are provided which run in one direction and these strips are crossed by other parallel strips 152 arranged in parallel relation and at right angles to the strips 148. With this arrangement, rectangular openings 154 are provided. It will be noted that the strips 156 (parallel to strips 148) at the inner end of the bundle or cartridge 134 are of a smaller length than the corresponding strips arranged at the outer end of the cartridge. This is due to the radial arrangement of the vertical baffles between the annular member 40 and the wall of the reactor 10.

It will also be noted that the larger end 146 of the cartridge or bundle 134 has shorter strips 158 which are parallel to the strips 152 above mentioned and this is due to the radial arrangement of the vertical baffles 100.

To construct the bundles or cartridges from the grating sections, the grating sections are arranged one above the other with the openings 154 in aligned relation so that the openings in the grating sections form smaller vertical cells which extend as continuous cells through each bundle or cartridge. As shown in Fig. 5, the grating sections 162 are arranged one above the other and welded together at a plurality of points as shown at 164.

As above pointed out, the cartridges or bundles above the lowermost cartridge or bundle 115 are each provided with depending supporting and spacing means so that the bundles or cartridges above the lowermost cartridge or bundle 115 are arranged one above the other in spaced relation. This supporting and spacing means will now be described. As shown in Figs. 4 and 5, this supporting means 136 comprises a flat vertically extending plate 166 which is of suitable metal construction and which is welded or otherwise suitably secured to the bottom of the cartridge or bundle 134.

As shown in Fig. 5 of the drawing, the upper end of the plate 166 is welded to the bottom grating section and to one of the spaced parallel strips 148 above described so that the flat plate 166 is in the same plane as one of the strips 148 of the subway grating. Preferably the plate 166 has a thickness greater than that of the strip 148 to which it is attached.

Extending at right angles from the central portion of the flat plate 166 is another flat vertically extending plate 172 which is welded at its upper end to the lowermost grating section forming a part of the bundle or cartridge 134. This welding is shown at 174. Plates 172 are preferably of thicker material than strips 152. The edge of the flat plate 172 abuts the first flat plate 166 and is welded thereto as shown at 175 to form a T-shaped member. The flat plate 172 is welded to one of the strips parallel to the strips 152 above described so that the flat plate 172 is in the same plane as one of the flat strips 152 which extend at right angles to the other spaced parallel strips 148 above described.

As shown in Fig. 5, the height of each of the flat strips or plates 172 and 166 is about one-half of the depth of the cartridge or bundle 134 so that the spaces between the bundles or cartridges of subway grating sections in the stripping section are about half the depth of each cartridge or bundle. While the ratio of the open space to the cartridge depth may be varied, it is preferred to maintain the above relationship, that is, to have the space about half the depth of the individual cartridges or bundles.

As shown in Fig. 4, there are two supporting means 136 at one end of each cartridge or bundle 134 and two other supporting means 175' shown at the other end of the cartridge or bundle 134. Only three supporting means may be used, if desired. The supporting means 175 are of substantially the same construction as described in connection with the supporting means 136.

The flat plates 166 of each supporting member 136 are thicker than strips 148 and will rest on flat strips which are parallel to the strips 148 above described and the other plates 172 which are arranged at right angles to the first named plates 166 and which are thicker than strips 152 will rest on the flat strips which are parallel to strips 152 above described.

As shown in Fig. 2 in the stripping section 38, in each cell there is a space 190 above the cartridge or bundle 134, and above this space 190 is another cartridge or bundle 192. Above the cartridge or bundle 192 is another space 194 above which is another cartridge or bundle 196. Above the bundle or cartridge 196 is a space 198 and above this space is another bundle or cartridge 202. Above this bundle or cartridge 202 is the space 54, the cartridge or bundle 52, the space 48 and the top bundle or cartridge 46 above described. In the particular form of the invention shown in Fig. 2 in each cell there are seven bundles or cartridges spaced one above the other, each bundle being made up of four grating sections. The depth of the space between the bundles is about half the depth of each bundle or cartridge.

There is the same arrangement of bundles or cartridges and spaces in each of the other vertical cells formed in the annular stripping section 38. While I have shown a certain number of cartridges or bundles, it is to be understood that the number of bundles or cartridges may be varied. Also, while each bundle or cartridge is shown as fabricated from four grating sections, it is to be understood that a different number of grating sections may be used. If desired, the cartridge or bundle may be made of the same depth as shown by making the bundle or cartridge as a unitary construction instead of separate grating sections. Instead of using four grating sections, the bundle or cartridge may be made of two grating sections of greater depth than those above described so that a bundle of about the same size is obtained, or sections of less depth may be used.

While the distribution plate or grid member 16 is shown in Fig. 2 as of a smaller diameter than the annular member 40 and the space between the grid member 16 and the annular member 40 is closed off by tapered annular member 92, it is to be understood that this is only one form of construction and that the distribution grid 16 may have the same diameter as the annular member 40 and member 92 may be eliminated.

During operation, as, for example, in the catalytic conversion of hydrocarbons, the temperature within the reaction vessel 10 may vary between about 800° F. and 1200° F. In the catalytic cracking of hydrocarbons, the temperature in vessel 10 is preferably between about 850° F. and 1000° F. and the particles of catalyst are at a temperature substantially equal to that in reaction vessel 10 when they are introduced into the upper portion of the annular stripping section 38. A suitable stripping gas, such as steam, oxygen-free flue gas, carbon dioxide, nitrogen, etc., but preferably saturated or superheated steam is introduced into the bottom of the stripping zone or section 38 by means of the stripping inlet lines 42 and 44.

The amount of steam used for stripping is from 1 to 8 lbs. of steam per 1000 lbs. of catalyst. The catalyst flow is between a maximum of 1500 lbs. and a minimum of 200 lbs. of catalyst per minute per square foot of stripping area.

In passing downwardly through the stripping section, the particles are intimately contacted with upflowing stripping gas in the individual cartridges or bundles. The spaces between the cartridges or bundles are provided to prevent any tendency of the gas to channel through the stripping section or zone 38 and to permit gas and catalyst redistribution at intervals. The superficial velocity of the steam passing up through the stripping zone or section 38 may be between about 0.5 ft./second and 2.5 ft./second as established by the steam-to-catalyst ratio employed and the operating conditions.

During stripping, the solid particles are maintained in a dense fluidized liquid-simulating condition, and when the catalyst particles are of about 200 to 400 standard mesh and comprise silica and alumina or other cracking catalyst, the density of the mixture is between about 10 lbs./cu. ft. and 30 lbs./cu. ft. In the spaces between the cartridges or bundles the particles are maintained in a dense turbulent condition and the particles are redispersed in the stripping gas. The velocity of the stripping gas in the spaces between the bundles is less than in the cells in the bundles due to the greater cross-sectional area.

The stripping gas and stripped out material leaves the top of the stripping section 38 and passes up through the dense bed or mixture 18 in vessel 10 and out through outlet line 34 at the top of vessel 10.

While the improved stripping section has been described in connection with the stripping of entrained and adsorbed vapors from fouled or contaminated catalyst particles, it is to be understood that the stripping section may be used for stripping volatile material from other finely divided solids and may also be used for stripping hot regenerated catalyst particles withdrawn from the regeneration zone to remove entrained oxygen from the hot regenerated catalyst particles before returning them to the reaction zone. A regenerator may be constructed similar to vessel 10.

In a commercial unit, the reaction zone 10 has an inside diameter of about 23 ft. and the outside diameter of the annular member 40 is about 19 ft., so that the width of the stripping section 38 or the distance from annular member 40 to the wall of the reaction vessel 10 is about 2 ft. The length of each vertical baffle 100 which forms the individual cells in distributing zone or section 38 is about 15½ ft. The length of the stripping section from about the top of the stripping gas inlets 42 and 44 to the top 114 is about 12½ ft. There are 36 individual cells and 36 gas inlet lines 42 and 36 gas inlet lines 44.

In the particular form of the invention shown, each cartridge or bundle is about 12" deep and each space between the adjacent bundles or cartridges is about 6" deep. The cartridges or bundles are shown as fabricated from four grating sections. The rectangular openings in the bundles are approximately 1 inch by 2 inches in dimension.

While I have shown the preferred form of my invention, it is to be understood that various changes and modifications may be made without departing from the spirit of my invention.

What is claimed is:

1. An apparatus of the character described for stripping solid particles which includes a cylindrical vessel for contacting solid particles and gaseous fluid, means for introducing solid particles and gaseous fluid into said vessel, means for withdrawing stripped particles from the bottom portion of said vessel, an annular member supported in the bottom portion of said vessel in spaced relationship to the inner wall of said vessel thereby forming an annular stripping chamber in the lower part of said vessel through which the solid particles are withdrawn in a dense, fluidized condition and stripped while being withdrawn, a plurality of vertical partitions extending transversely of and for substantially the entire height of said stripping chamber thereby forming a plurality of separate elongated cells in said stripping chamber, a plurality of bundles of open grating sections in each of said elongated cells spaced one above the other, and being of a size substantially that of the cross sectional area of a cell to fit therein, means for introducing stripping gas in the lower portion of said stripping chamber into each cell below the lowermost bundle of open grating sections, supporting bars in each cell secured to the lower portions of said vertical partitions above said means for introducing said stripping gas for supporting the lowermost bundle in each cell, spacing supports depending from each bundle above the lowermost bundle in each cell for spacing bundles of open grating sections one above the other in each cell, the spacing supports of a higher bundle resting on the top surface of the next lower bundle, there being two separate spacing supports for each side of each of said bundles, each support including two plates arranged vertically and secured together to form a structure T-shaped in horizontal cross section with the upper edge of one plate secured to the lower edge of one cross member of the bottom grating section in each bundle and the upper edge of the other plate secured to the lower edge of a cross member extending at right angles to the first-mentioned cross member and the bottom edges of said plates resting on corresponding cross members of the next lower bundle.

2. An apparatus of the character described for stripping solid particles which includes a cylindrical vessel for contacting solid particles and gaseous fluid, means for introducing solid particles and gaseous fluid into said vessel, means for withdrawing stripped particles from the bottom portion of said vessel, an annular member supported in the bottom portion of said vessel in spaced relationship to the inner wall of said vessel thereby forming an annular stripping chamber in the lower part of said vessel through which the solid particles are withdrawn in a dense, fluidized condition and stripped while being withdrawn, a plurality of vertical partitions extending transversely of and for substantially the entire height of said stripping chamber thereby forming a plurality of separate elongated cells in said stripping chamber, a plurality of bundles of open grating sections in each of said elongated cells spaced one above the other and being of a size substantially that of the cross sectional area of a cell to fit therein, means for introducing stripping gas in the lower portion of said stripping chamber into each cell below the lowermost bundle of open grating sections, supporting bars in each cell secured to the lower portions of said vertical partitions above said means for introducing said stripping gas for supporting the lowermost bundle in each cell, a plurality of spacing supports secured to and depending from each bundle above the lowermost bundle in each cell for spacing bundles of open grating sections one above the other in each cell, the spacing supports of a higher bundle resting on the top surface of the next lower bundle, each support including two plates arranged vertically and secured together to form a structure T-shaped in horizontal cross section with the upper edge of one plate secured to the lower edge of one cross member of the bottom grating section in each bundle and the upper edge of the other plate secured to the lower edge of a cross member extending at right angles to the first-mentioned cross member and the bottom edges of said plates resting on corresponding cross members of the next lower bundle.

HENRY J. OGORZALY.

REFERENCES CITED

The following references are of record in the file of this patent:

UNITED STATES PATENTS

| Number | Name | Date |
|---|---|---|
| 322,257 | Chase | July 14, 1885 |
| 512,547 | Harmon | Jan. 9, 1894 |
| 1,239,216 | Randolph | Sept. 4, 1917 |
| 2,359,310 | Hemminger | Oct. 3, 1944 |
| 2,394,814 | Snuggs | Feb. 12, 1946 |
| 2,400,194 | Day | May 14, 1946 |
| 2,415,755 | Ogorzaly et al. | Feb. 11, 1947 |

FOREIGN PATENTS

| Number | Country | Date |
|---|---|---|
| 623,000 | Germany | June 8, 1937 |